United States Patent Office 3,707,565
Patented Dec. 26, 1972

3,707,565
PHENOL SULFIDE DERIVATIVES
Kurt Hofer, Munchenstein, Basel-Land, Switzerland, assignor to Sandoz Ltd. (also known as Sandoz AG), Basel, Switzerland
No Drawing. Filed Aug. 20, 1969, Ser. No. 851,721
Claims priority, application Switzerland, Aug. 28, 1968, 12,899/68
Int. Cl. C07c 149/30
U.S. Cl. 260—608                              8 Claims

ABSTRACT OF THE DISCLOSURE

Novel phenols obtained by reacting a compound of the Formula I

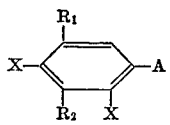

in which
  one X is selected from hydroxyl groups and the residues of esters of phosphoric acid and of phosphorous acid and the other X is selected from hydrogen atoms and tertiary butyl radicals,
  each of $R_1$ and $R_2$ is independently selected from hydrogen atoms and tertiary butyl radicals,
  A is selected from phenyl radicals and phenyl radicals substituted by up to 2 tertiary butyl radicals,
with the proviso that at least one of $R_1$ and $R_2$ must be a tertiary butyl radical and with the further proviso that at most 3 tertiary butyl radicals may be present per molecule; with a condensing agent which is adapted to cause linking between phenol molecules (e.g. sulphur monochloride, sulphur dichloride, phosphorus trichloride or formaldehyde with or without an alkylene mercaptan) are described and their use as stabilizers against certain deterioration phenomena, especially adverse effect of light, heat or oxidation with organic materials, especially plastics such as polypropylene.

---

The present invention relates to novel phenol derivatives, a process for their production and their use as stabilizers for plastics or other organic materials against certain deterioration phenomena on exposure to heat or oxygen or sometimes even light.

Many phenols and phenol derivatives have previously been proposed for use as stabilizers for organic materials, especially plastics against heat or oxidation deterioration, partly also against deterioration caused by light. Of these materials those of especial technical significance are (i) sterically hindered phenols, for example:

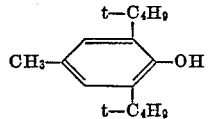

(ii) bisphenols, for example:

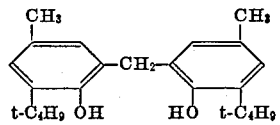

and (iii) sulphur containing phenols, for example:

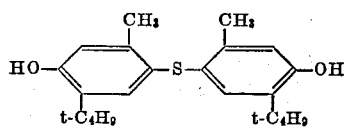

It has likewise been proposed previously to use butylated phenyl phenols and products obtained by linking two molecules of p-hydroxydiphenyl by means of agents having a condensing effect (e.g. sulphur chloride or an aldehyde), in order to stabilize polyolefins.

It is known that the nature of the substitution of the phenols is of the greatest importance for the effectiveness of these substances as stabilizers. The presence of a bulky alkyl residue, especially the tert.-butyl residue in the o-position to the phenolic OH-group, has shown itself to be particularly favourable. When such groups are absent, the effectiveness is appreciably lower and, furthermore, discolouration of substrates containing such phenols occurs. As a result, it has been established that only highly uniform and defined compounds are suitable for use as stabilizers and for that reason the manufacture of such compounds tends to be expensive.

It has now been found that especially good stabilizing effects are obtained when there are used as stabilizers for plastics compounds which have been obtained by the condensation of two or more molecules of a hydroxydiphenyl containing at least one tertiary butyl residue situated in the ortho-position to the hydroxyl group by means of a di- or polyfunctional agent.

The present invention provides a process for the production of phenol derivatives, which is characterized in that a compound of the formula

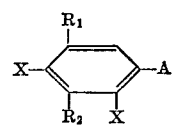

in which
  one X is selected from hydroxyl groups and the residues of esters of phosphoric acid and of phosphorous acid and the other X is selected from hydrogen atoms and tertiary butyl radicals,
  each of $R_1$ and $R_2$ is independently selected from hydrogen atoms and tertiary butyl radicals,
  A is selected from phenyl radicals and phenyl radicals substituted by up to 2 tertiary butyl radicals, with the proviso that at least one of $R_1$ and $R_2$ must be a tertiary butyl radical and with the further proviso that at most 3 tertiary butyl radicals may be present per molecule; is reacted with a condensing agent which is adapted to cause linking between phenol molecules.

By carrying out the above process there are obtained new compounds; these form part of the present invention and have the formula

wherein
  $n$ is a whole number,
  Y is selected from —S—, —S—S—,

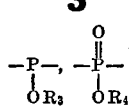

and

B is a residue of a compound of the Formula I linked to Y directly at the aromatic nucleus, and each of $R_3$ and $R_4$ is independently selected from hydrogen atoms, alkyl radicals with 1 to 18 carbon atoms, cyclohexyl- or methylcyclohexyl radicals, hydroxyalkyl radicals with 2 to 6 carbon atoms, alkylene radicals derived from polyfunctional alcohols with 2 to 6 carbon atoms, phenyl radicals, $C_{1-18}$-alkyl-phenyl radicals, hydroxyphenyl or phenylene radicals derived from resorcinol, hydroxyphenyl or phenylene radicals derived from hydroquinone, hydroxydiphenyl radicals, hydroxydiphenylpropane radicals and radicals derived from 4,4'-dihydroxydiphenyl and 4,4'-dihydroxydiphenylpropane, each of $R_5$ and $R_6$ is independently selected from hydrogen atoms, alkyl radicals with 2 to 4 carbon atoms, alkylene radicals with 1 to 4 carbon atoms, cyclohexyl radicals and methylcyclohexyl radicals with the proviso that, when $R_3$ and $R_4$ are divalent residues, they link two residues selected from ones of the formulae:

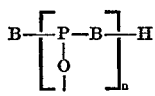

and

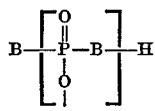

The compounds of the Formula II may be obtained, for example, by reacting a compound of the Formula I, optionally in the presence of a Friedel-Crafts catalyst e.g. aluminium chloride, boron fluoride or ethereal boron fluoride) and, if desired, in the presence of a solvent (e.g. carbon tetrachloride, 1,2 - dichloroethane, hexachloroethane or chlorobenzene), at temperatures of from 0–160° C. with a polyfunctional agent—including a difunctional one—(e.g. formaldehyde, acetaldehyde, propionaldehyde, butyraldehyde, crotonaldehyde, acetone, methylethyl ketone, cyclohexanone, sulphur, sulphur monochloride, sulphur dichloride, phosphorus trichloride, or phosphorus oxychloride) and, when the reaction product has been obtained by the reaction of the compound of the Formula I with phosphorus trichloride or phosphorus oxychloride, replacing with OH-groups those chlorine atoms present which are linked to the phosphorus atom by treatment of the reaction product with water of an aqueous alkaline solution.

The chlorine atoms referred to in the last sentence may be replaced with alkoxy-, cycloalkoxy, or aryloxy groups by treating those reaction products containing labile chlorine atoms with an alcohol or phenol (for example an alkanol containing 1–18 carbon atoms, cyclohexyl- or methylcyclohexyl alcohol, a glycol containing 2–6 carbon atoms in the molecule, glycerine, pentaerithrytol, phenol or a $C_{1-18}$-alkyl phenol, resorcinol, hydroquinone, 4,4'-dihydroxydiphenyl or 4,4'-dihydroxydiphenyl propane).

When the reaction is effected with formaldehyde or another low molecular weight aldehyde, it may be advantageous to carry it out in the presence of a mercaptan, for example n-butyl-, n-octyl-, n-dodecyl or isododecylmercaptan. Suitably the polyfunctional agent is used in an amount of from 0.5–1 mol for every mol of the compound of the Formula I. The reaction products mainly are constituted by compounds of the formula

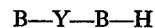

especially when there is used, per mol of the compound of the Formula I, less than 1 mol of the polyfunctional agent. However, when there is used per mol of the compound of the Formula I 1 mol or not appreciably less than 1 mol of the polyfunctional agent, they likewise contains to a lesser extent compounds of the formula

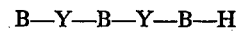

and those of the formula B—Y—B—Y—B—Y—B—H.

When more than 1 polyfunctional agent is used in order to link those compounds of the Formula I in which $n$ is greater than 1, compounds of the Formula II result in which the various bridging members Y may be different. For example, one Y may be sulphur and the other may be

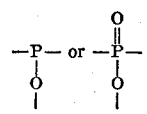

Such compounds are obtained, for example, when compounds of the Formula I are reacted, in any desired sequence, with (i) sulphur or a sulphur chloride and (ii) phosphorus trichloride or phosphorus oxychloride.

The compounds of the Formula I may be obtained from 2- or 4-hydroxydiphenyl by the addition of 1–3 mol of isobutylene or by reaction thereof with an iso- or tertiary-butyl halide or an iso- or tertiary-butyl alcohol in the presence of a catalyst, whereby mixtures of isomers result containing 1–3 tertiary-butyl residues; these may be used directly for the production of the compounds of the Formula II. When the starting material is 1 mol of 2-hydroxydiphenyl to which 1–3 mol of isobutylene have been added isomer mixtures of the Formula II which have been obtained in this way contain, as has been ascertained by investigation with the aid of gas chromotography or infrared or nuclear resonance spectroscopy, the following compounds

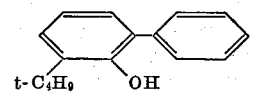

and

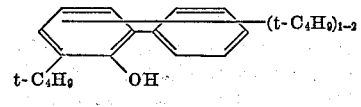

These two compounds together amount to at least 90% of the resulting product.

When the starting material is 1 mol of 4-hydroxydiphenyl and 1–3 mol isobutylene, an isomer mixture results containing 80 to over 90% of compounds of the formulae:

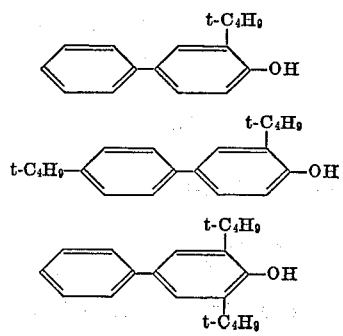

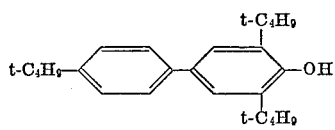

and additionally only a little (about 5–15%) of the compound of the formula

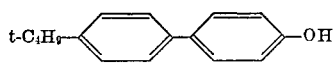

These isomer mixtures are usually obtained as highly viscous, practically odourless liquids which may be converted in the manner described to isomer mixtures of the compounds of the Formula II by condensation.

The condensation products according to the invention may be worked into plastics in the usual way, for example by mixing with the molten or dissolved plastics. They have been found especially suitable for stabilizing polyolefins, for example polyethylene and polypropylene with which they do not only have an excellent stabilizing effect as regards the effect of heat, oxidation and to some degree also of light, but they are also characterized by a low degree of evaporation and migration when incorporated therein.

The compounds according to the invention may be used, however, likewise with success for stabilizing other plastics. They may be added to the materials to be protected or stabilized in amounts of from 0.05 to 2%.

In the following examples the temperatures are stated in degrees centigrade, "λ max." signifies the wave length, which is adsorbed most strongly; this wave length is given in nm. (nanometer=$10^{-9}$ m.).

BUTYLATION OF HYDROXYDIPHENYLS

Example (a)

After the addition of 0.08 mol of aluminium chloride to 1 mol of 2-hydroxydiphenyl, 2.5 mol of isobutylene are introduced, while stirring well at 100–110° during 2½ hours. Stirring is continued for 1 hour at 100°, cooling is effected and the reaction product is run into iced water containing a little hydrochloric acid. Separation is effected, the oily layer is washed with water, and water and a small amount of polymerized isobutylene are removed by heating in a vacuum to 150°. The residue is constituted by a brownish, thick liquid, practically odourless oil which contains about 2.3 mol of isobutylene per mol of 2-hydroxydiphenyl. λ max.: 286–289 nm. (in hexane), E=5500.

Practically the same product is obtained when adding dropwise, instead of isobutylene, the corresponding amount of tert.-butylchloride.

Example (b)

1 mol of 2-hydroxydiphenyl is melted at about 75°, 0.015 mol of ethereal boron fluoride is added and then, while stirring well, 2 mol of isobutylene are introduced during about 2 hours. The temperature is maintained during 1 hour at 75°, 0.05 mol of potassium carbonate in the form of a 10% aqueous solution is added and stirring for 10 minutes is effected. Thereafter the aqueous solution is separated off and the oil is again washed with water at 70°. Subsequently dehydration in a vacuum at 150° is effected, a little polymerized isobutylene being distilled off simultaneously. A residue is obtained in the form of a pale brownish, thick liquid oil which contains about 1.75 mol isobutylene per mol 2-hydroxydiphenyl. λ max.: 286–289 nm. (in hexane), E=5500.

Example (c)

After the addition of 5 cc. ethereal boron fluoride to the solution of 170 g. 4-hydroxydiphenyl in 350 g. chlorobenzene, there is introduced, while stirring well, at 95–100° and, during 1½ hours, 90 g. of isobutylene. Stirring is continued for 1 hour at 95°, the solution is washed with 10 g. of potassium carbonate in 250 cc. water and the chlorobenzene and polymerized isobutylene are removed by water vapour distillation. After drying, the resulting residue (243 g.) is constituted by a soft, crystalline mass. Based on the increase in weight it is possible to calculate that about 1.3 mol isobutylene per mol 4-hydroxydiphenyl have reacted.

By gas chromatography the following composition was established:

about 5% 4-hydroxydiphenyl
about 43% 3-tert.-butyl-4-hydroxydiphenyl
about 43% highly butylated 4-hydroxydiphenyls with a tert.-butyl group in the 3-position
and about 9% 4'-tert.-butyl-4-hydroxydiphenyl.

Example (d)

10 cc. ethereal boron fluoride are added while stirring to 340 g. 4-hydroxydiphenyl and 600 g. ethylene chloride. At 80–85° during 2 hours 270 g. isobutylene are introduced and reaction is allowed to continue for a further hour at the same temperature. Subsequently 200 cc. of a 10% potassium carbonate solution are stirred in, separation is effected and washing with water is again effected. Subsequently ethylene chloride, water and polymerized isobutylene are distilled off in a vacuum, the temperature being raised up to 160°. The residue is constituted by 562 g. of a clear, brownish, tough liquid mass which is odourless, λ max.: 268–276 nm. (in ethanol), E=about 18,400.

The composition determined by means of gas chromatography is as follows:

about 1% 4-hydroxydiphenyl
about 32% 3-tert.-butyl-4-hydroxydiphenyl
about 57% highly butylated 4-hydroxydiphenyls with a tert.-butyl group in the 3-position
and about 10% 4-tert.-butyl-4-hydroxydiphenyl.

From the weight increase it is possible to calculate an uptake of 2 mol isobutylene per mol 4-hydroxydiphenyl.

Example (e)

After the addition of 10 cc. ethereal boron fluoride to 340 g. 4-hydroxydiphenyl (2 mol) dissolved in 600 g. carbon tetrachloride, 370 g. isobutylene (6.6 mol) are introduced at 60–65° while stirring well; the addition lasts about 2 hours with further reaction for 1 hour. After working up as described in Example (d), 666 g. of a brownish, thick liquid oil are obtained; $D_4^{20}$=0.959 g./cc., λ max.: 267–271 nm., E=about 17,200; gas chromatography shows the following approximate composition:

about 1% 4-hydroxydiphenyl
about 24% 3-tert.-butyl-4-hydroxydiphenyl
about 67% of highly butylated 4-hydroxydiphenyls with a tert.-butyl group in the 3-position,
and about 8% 4'-tert.-butyl-4-hydroxydiphenyl.

A content of 2.9 mol isobutylene per mol 4-hydroxydiphenyl was calculated.

Practically the same product is obtained when 5 g. of boron fluoride are used as catalyst instead of the 10 cc. ethereal boron fluoride.

CONDENSATION OF THE BUTYLATED HYDROXYDIPHENYLS

Example 1

60 g. of butylated 2-hydroxydiphenyl according to Example (a) are dissolved in 150 g. carbon tetrachloride, cooling to −10° is effected and 3 g. aluminium chloride are added. 15 g. sulphur chloride ($S_2Cl_2$) are slowly added dropwise while stirring and stirring is then continued for 6 hours at room temperature. The reaction solution is washed with water and 10% sodium carbonate solution and the solvent is then removed by distillation in a vacuum. 65 g. of a brownish, resinous mass are obtained containing 11.3% sulphur.

The product is easily soluble in alcohol, hexane and chlorinated hydrocarbons. λ max.: 287-295 nm. (ethanol), E=about 13,500.

When 12 g. of sulphur dichloride ($SCl_2$) are used instead of 15 g. of sulphur chloride, there is obtained by following the same method of working 63 g. of a sulphur containing condensation product which is likewise easily soluble in alcohol, hexane and chlorinated hydrocarbons; the product shows λ max. at 288-295 nm. and E at about 14,000.

Example 2

The procedure is as in Example 1, but 60 g. of butylated 4-hydroxydiphenyl are used which were obtained according to Example (d), instead of butylated 2-hydroxydiphenyl. 68 g. of a light, brownish mass are obtained capable of being pulverized easily (sulphur content 11.2%). The melting range of the product is between 50 and 64°, λ max.: 260-270 nm. (in alcohol), E=about 17,000.

Example 3

15 g. of phosphorus trichloride are added dropwise while stirring well at about 85° to a mixture of 60 g. of butylated 2-hydroxydiphenyl obtained according to Example (b), 150 g. 1,2-dichloroethane and 30 g. sodium carbonate; stirring for 3 hours at 85° is effected. 15 g. of n-butanol are then added and heating to 85° is effected for a further 2 hours. The reaction product is washed well with water, and solvent and excess butanol are taken off in a vacuum at 100°. 68 g. of a weakly yellow liquid are obtained, $D_4^{20}$=1.007 g./cc. (phosphorus content: 2.6%). It is easily soluble in the usual organic solvents, λ max.: 289-293 nm. (in alcohol).

By replacing the butanol with another alcohol, e.g. methanol, ethanol, propanols, isobutanol, amyl-, hexyl- and octylalcohols, products are obtained which are likewise liquid and of which λ max. is around 289-293 nm. When using polyalcohols, e.g. ethyleneglycol, diethyleneglycol, propyleneglycol, butyleneglycol, hexyleneglycol, glycerine, pentaerythritol, similar products are obtained which, however, are more viscous.

Example 4

30 g. of phosphorus trichloride are slowly added dropwise, while stirring, at 80-85° to a solution of 68 g. of butylated hydroxydiphenyl obtained according to Example (e) in 150 g. 1,2-dichloroethane; stirring at 85° is effected for 3 hours. Thereafter 30 g. n-butanol and 30 g. sodium carbonate are added slowly and stirring for 3 hours at 85° is effected. After washing out with water, the solvent is distilled off in a vacuum and about 80 g. of a thickly liquid, yellowish liquid result (phosphorus content: 3.2%). λ max.: 262-270 nm. (alcohol).

As in Example 3 it is likewise possible in this case to use, instead of butanol, another alcohol, a glycol or a phenol (e.g. 4-tert.-butylphenol or 2,4-ditert.-butylphenol).

Example 5

60 g. of butylated 4-hydroxydiphenyl obtained according to Example (c) are dissolved in 150 g. carbon tetrachloride and cooling to −10° is effected. 5 cc. ethereal boron trifluoride are added and 15 g. phosphorus trichloride are added dropwise while stirring during 1 hour. Stirring is effected at −10° for 1 hour, at 0° for 1 hour and at 50° for two hours. Subsequently 50 g. ethanol are added and stirring at 50° for 1 hour is effected. The resulting solution is washed with water and 10% potassium carbonate solution, and solvent is removed by distillation in a vacuum. 70 g. of a thickly liquid yellowish product result (phosphorus content: 3.0%). λ max.: 265-270 nm. (in alcohol).

From the infrared spectrum it is seen that in this case the sterically hindered phenolic OH-groups are still present (sharp bands at 2.75µ. For this reason it is likely that a direct linkage between the diphenyl nucleus and the phosphorus has been mainly formed. In contradistinction thereto, the phenolic OH-groups in the case of the substances obtained according to Examples 3 and 4 are mainly esterified with the phosphite residue.

Example 6

8 g. of sulphur chloride ($S_2Cl_2$) are added dropwise, while stirring at 20°, to 60 g. of butylated 4-hydroxydiphenyl obtained according to Example (c) and dissolved in 150 g. 1,2-dichloroethane; stirring for 2 hours at 60° is effected, 8 g. of phosphorus trichloride are then added dropwise, stirring for two hours at 80° is effected, 20 g. n-butanol and 10 g. sodium carbonate are added and the material is kept for a further 2 hours at 80°. Washing with water is effected and the solvent is distilled off in a vacuum. 72 g. of a highly viscous brownish oil remain; λ max.: 263-269 nm. (in alcohol).

Example 7

60 g. of butylated 4-hydroxydiphenyl according to Example (d) together with 200 g. 30% hydrochloric acid and 10 g. 36% formaldehyde are heated while stirring to 90 to 95° for 8 hours. After cooling and separating the acid solution, a resin is obtained which is washed with a 10% soda solution and water and then dried in a vacuum at 70°. Melting point: 57-65°; λ max.: 264-267 nm. (in alcohol).

Instead of formaldehyde it is likewise possible to use propionaldehyde or butyraldehyde; instead of the butylated 4-hydroxydiphenyl, it is possible to use butylated 2-hydroxydiphenyl.

Example 8

60 g. of butylated 4-hydroxydiphenyl according to Example (d) are stirred at 95 to 100° for 6 hours with 200 g. of 30% hydrochloric acid solution, 20 g. 36% formaldehyde and 15 g. n-octylmercaptan. The mercaptan smell has completely disappeared after that time. Acid is separated off and the residue is washed with a 10% soda solution and with water, drying is then effected in a vacuum at 90°. 75 g. of a viscous brownish liquid are obtained which is soluble in the usual organic solvents. λ max.: 265-270 nm. (in alcohol).

Example 9

3 g. of aluminium chloride are stirred at −10° into 60 g. 3-tert.-butyl-4-hydroxydiphenyl (B.P. at 0.5 mm. Hg: 170-175°) dissolved in 150 g. of carbon tetrachloride and then 15 g. sulphur chloride ($S_2Cl_2$) are added during 30 minutes and stirring is effected for 6 hours at about 20°. Subsequently stirring with 10 cc. 30% hydrochloric acid solution and 100 cc. iced water is effected, separation is carried out and washing with a 10% potassium carbonate solution in water. The solvent is then distilled off in a vacuum at 90°. A yellowish product of melting point 57 to 59° is obtained and this corresponds to the formula

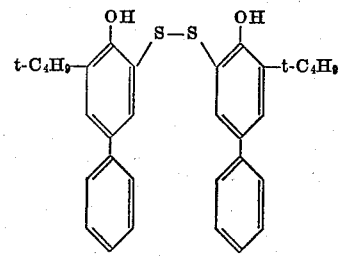

Calculated sulphur content 12.45%, found: 12.7%.

Example 10

60 g. 3-tert.-butyl-2-hydroxydiphenyl (boiling point at 0.1 mm. Hg: 140-150°) are dissolved in 150 g. carbon tetrachloride and 12 g. sulphur dichloride are added while stirring at −10°. Stirring is then effected at about 20° for 6 hours and subsequently washing with 10% potassium carbonate solution in water is effected, the solvent is removed in a vacuum at 90° and 66 g. of a viscous product corresponding to the formula

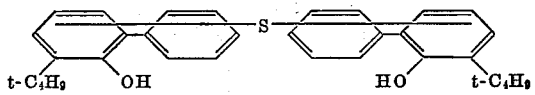

are obtained.

Calculated sulphur content: 6.63%, found: 6.5%.

EXAMPLES OF USE

Example A

The light stability of (a) unstabilized polypropylene was compared with similar propylene, but which had been stabilized, on the one hand, with
(b) 0.5% of the stabilizer produced according to Example 6, and on the other hand, with
(c) 0.5% of the known stabilizer trinonylphenyl phosphite.

The stabilized and the unstabilized polypropylenes were pressed at 180°, each to form a sheet of 0.3 mm. thickness and the resulting sheets illuminated in a Xenotest illuminating device to make them brittle. The times taken for the illumination are as follows:

(a) 80 hours
(b) 400 hours without any change
(c) 200 hours.

Example B

The stability to heat of unstabilized polypropylene (h) was compared with similar polypropylene, but which had been stabilized with 0.5% of its weight, on the one hand, with known stabilizers indicated at (i) and (k) or with the uncondensed butylated hydroxydiphenyls (l) and (m) or with the methylbutylphenol derivatives (n) and (o), as well as, on the other hand, with stabilizers according to the invention indicated at (p), (q), (r), (s) and (t).

The stabilized and the unstabilized polypropylenes were pressed at 180° each to form 0.3 mm. thick sheets and these were heated to 140° until they became brittle.

The relative times are stated in the following table.

TABLE

| Additive (0.5%): | Time taken for brittleness to occur at 140° in hours |
|---|---|
| (h) No additive | 1 |
| (i) Di-tert.-butyl-p-cresol | 2 |
| (k) Di-lauryl-thiodipropionate | 40 |
| (l) Substance according to Example (a) | 4 |
| (m) Substance according to Example (d) | 8 |
| (n) [1] | 96 |
| (o) [2] | 240 |
| (p) Substance according to Example 2 | >720 |
| (q) Substance according to Example 6 | >720 |
| (r) Substance according to Example 7 | 480 |
| (s) Substance according to Example 9 | [3] |
| (t) Substance according to Example 10 | |

[1] Formula:

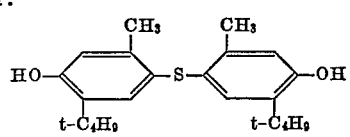

[2] Formula:

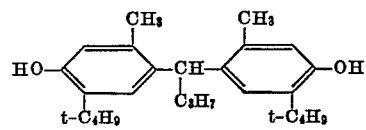

[3] Unchanged after 500.

Although the present invention is described herein with particular reference to specific details, it is not intended that such details shall be regarded as limitations upon the scope of the invention except insofar as included in the accompanying claims.

I claim:

1. A phenol derivative of the formula

wherein $n$ is a whole number from 1 to 3,
Y is selected from —S— and —S—S—
B is a radical of a compound of the Formula I below linked to Y directly at the phenolic aromatic nucleus, wherein Formula I is represented by

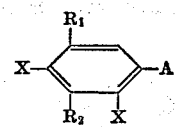

(I)

in which one X is hydroxyl and the other X is a hydrogen atom or a tertiary butyl radical, each $R_1$ and $R_2$ is independently selected from hydrogen atoms and tertiary butyl radicals, A is selected from phenyl radicals and phenyl radicals substituted by up to 2 tertiary butyl radicals, with the proviso, that at least one of $R_1$ and $R_2$ must be a tertiary butyl radical, with the further proviso, that at most 3 tertiary butyl radicals may be present per molecule and with the further proviso that the hydroxyl group is in ortho-position to a tertiary butyl radical.

2. A mixture comprising a compound as claimed in claim 1 wherein $n$ is 1 together with a minor proportion of at least one said compound wherein $n$ is 2 and wherein $n$ is 3.

3. An isomeric mixture of compounds according to claim 1 wherein the radicals B are independently selected from radicals of compounds of the formulae

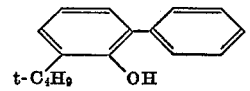

and

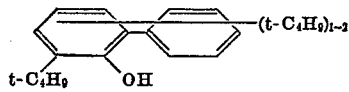

4. An isomeric mixture of compounds according to claim 1 wherein the radicals B are independently selected from radicals of compounds of the formulae

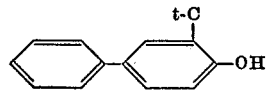

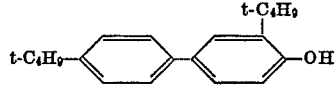

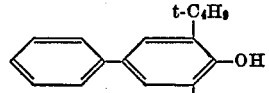

and

5. A compound according to claim 1 of the Formula I, wherein B is selected from radicals of the compounds of the formula

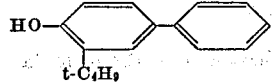

and

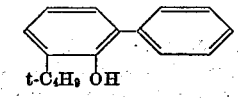

and Y is —S—S—.

6. A compound according to claim 1 of the Formula I, wherein B is selected from radicals of the compounds of the formulae

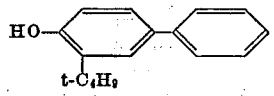

and

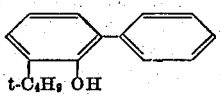

and Y is —S—.

7. A compound according to claim 1 corresponding to the formula

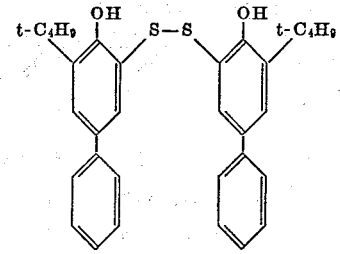

8. A compound according to claim 1 corresponding to the formula

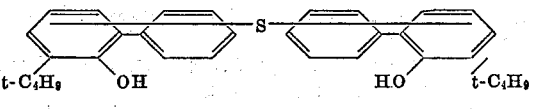

References Cited
UNITED STATES PATENTS 3,100,229    8/1963    Orlof             260—609 F
3,060,121    10/1962    Orlof et al.      260—609 F LEWIS GOTTS, Primary Examiner D. R. PHILLIPS, Assistant Examiner U.S. Cl. X.R.

260—45.95, 609 F, 620, 932, 953, 958, 961, 962